C. E. ZIMMERMANN.
MACHINE FOR CUTTING COLUMN STAVES.
APPLICATION FILED APR. 29, 1911.
1,054,073.
Patented Feb. 25, 1913.
2 SHEETS—SHEET 2.
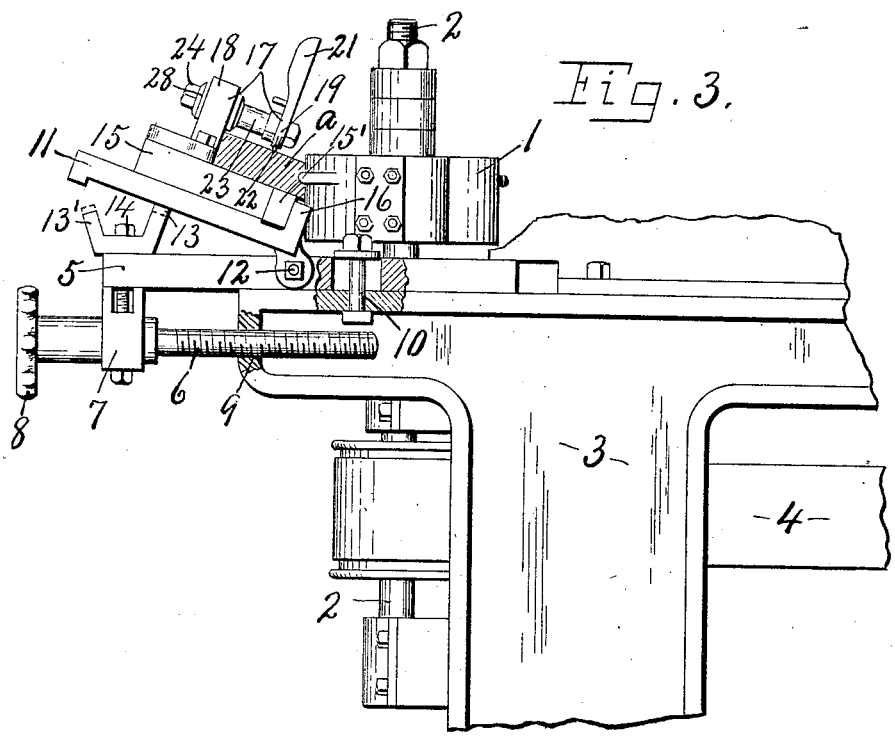
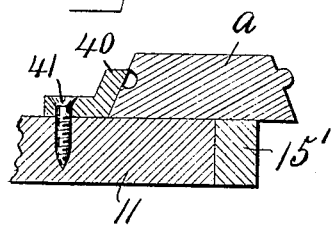
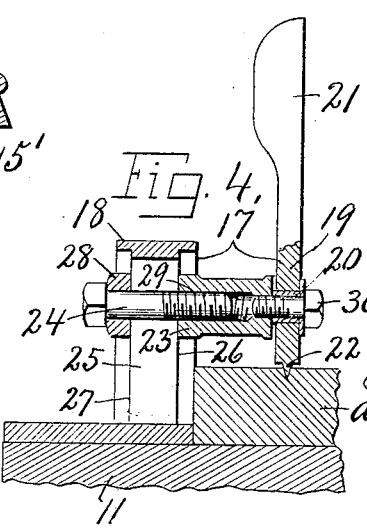
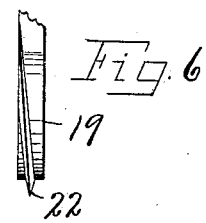
WITNESSES
Chas. E. Skelton
H. E. Chan
INVENTOR
C. E. Zimmermann,
BY
Howard P. Denison
ATTY.

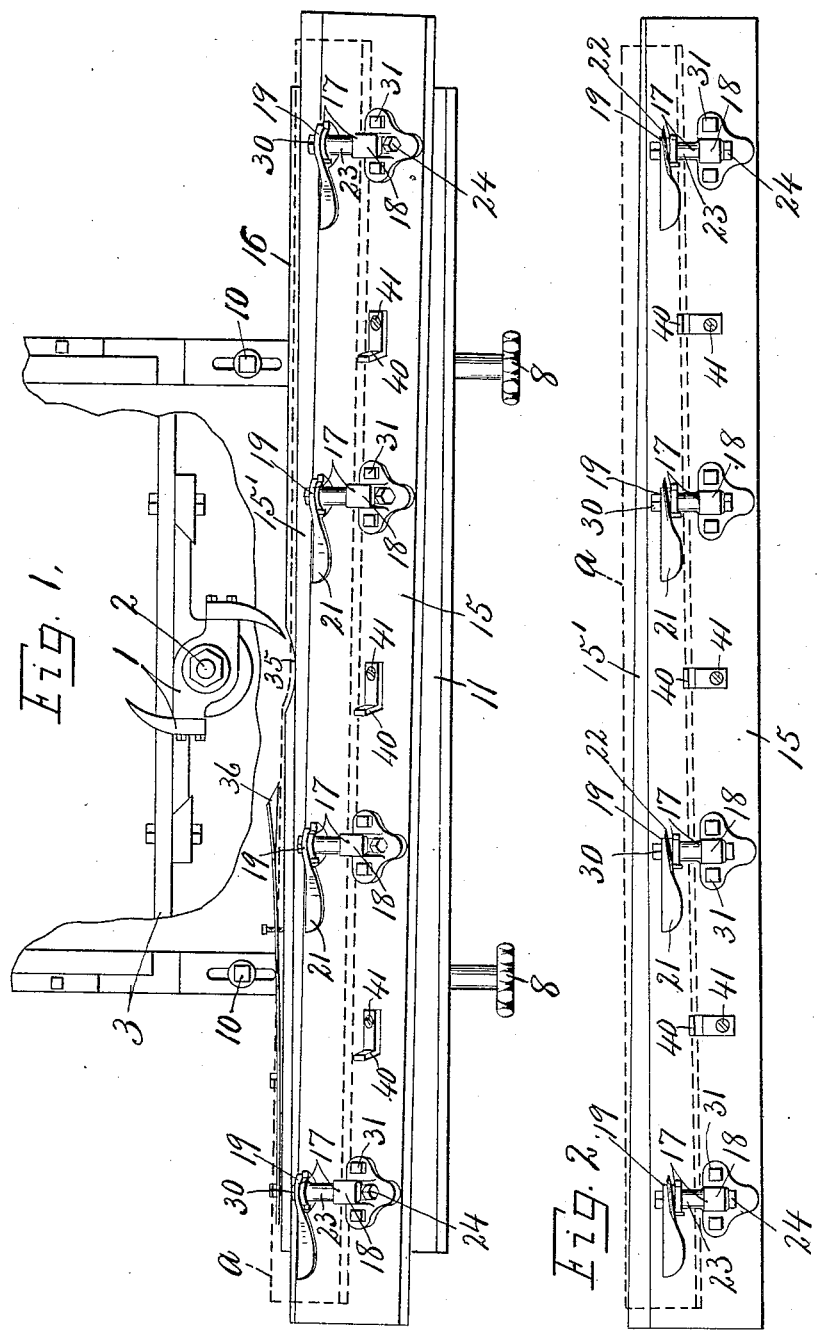

UNITED STATES PATENT OFFICE.

CHARLES E. ZIMMERMANN, OF SYRACUSE, NEW YORK.

MACHINE FOR CUTTING COLUMN-STAVES.

1,054,073. Specification of Letters Patent. Patented Feb. 25, 1913.

Application filed April 29, 1911. Serial No. 624,027.

*To all whom it may concern:*

Be it known that I, CHARLES E. ZIMMERMANN, of Syracuse, in the county of Onondaga, in the State of New York, have invented new and useful Improvements in Machines for Cutting Column-Staves, of which the following, taken in connection with the accompanying drawings, is a full, clear, and exact description.

This invention relates to certain improvements in machines for cutting wood staves for hollow columns and other cylindrical or multi-sided structures which are made up of a series of relatively narrow strips, slats or staves secured together edge to edge but is more especially designed for manufacturing staves for tapering or what is commonly termed swell-columns in which the diameter varies more or less from end to end.

The primary object of my present invention is to enable the component parts or staves of the column to be accurately and economically sized and formed so as to produce approximately the desired form of column when assembled edge to edge, without necessitating the springing or other deformation of the staves, and at the same time to form said edges with tongues and grooves adapted to be interlocked with each other as they are assembled in the formation of a column for holding them in fixed relation throughout their lengths, thereby increasing the strength of the column and affording a greater surface area for the reception of glue or other suitable adhesive by which the staves are permanently held together. In other words I have sought to provide a simple device whereby the staves may be made of uniform width or size, either cylindrical, taper or swell and their edges simultaneously tongued and grooved and also beveled to any angle according to the radius of the column which they are adapted to form so that their meeting edges will lie in planes substantially coincident with the radial planes of the angles in which such edges are located.

A further object is to provide simple means for varying the angle of the beveled edges.

A still further object is to enable both edges of the stave to be tapered to the same degree by merely reversing the form by which the taper of swell is determined.

Another object is to provide simple means for quickly and firmly clamping and releasing the stave to and from the carriage by which it is moved across the face of the cutter.

Other objects and uses will be brought out in the following description:

In the drawings—Figure 1 is a top plan of a portion of a stave cutting machine embodying the various features of my invention, showing a portion of the carriage and an unfinished stave mounted thereon ready for cutting the grooved side. Fig. 2 is a top plan of the detached carriage. Fig. 3 is an enlarged side elevation of the parts shown in Fig. 1 except that the stave and a portion of the frame are shown in section to illustrate the means of adjustment for varying the width of the stave. Fig. 4 is a still further enlarged detail sectional view of a portion of the carriage and one of the stave clamping devices. Fig. 5 is an enlarged sectional view of the finished stave and portion of its supporting carriage showing one of the adjustable abutments. Fig. 6 is an elevation of a portion of a detached cam showing the spiral rib.

In carrying out the objects stated, a rotary cutter —1— is mounted upon an upright shaft —2— which is journaled in suitable bearings upon a main supporting frame —3— and adapted to be driven from any available source of power by means of a belt —4— or other suitable power transmitting mechanism.

The cutter —1— which is shown is adapted for initially beveling and grooving one edge of a stave as —a— and for this purpose is preferably provided with diametrically opposite edges capable of simultaneously cutting the bevel and groove but is adapted to be replaced by a similar cutter having grooved cutting edges for cutting the tongue and bevel on the opposite edge of the stave in a manner hereinafter described.

Mounted upon the upper side of the main supporting frame —3— in a plane below the cutter —1— is a horizontally adjustable bed —5— adapted to be moved transversely of and at substantially right angles to the axis of the cutter by suitable adjusting means as a screw —6— having one end rotatably mounted in a pendant bearing —7— on the bed —5— and provided with a hand piece —8— while its other end is threaded and engaged in a threaded aperture —9— in the front side of the main supporting frame —3— as best seen in Fig. 3, the object of which is to permit the stave supporting carriage to be adjusted toward and from the cutter to vary the width of the staves, the bed —5— being held in its adjusted position by one or more clamping bolts —10—.

A tiltable bed or table —11— is pivotally connected at its rear edge at —12— to the adjustable bed —5— and is adapted to be held in its tilted position at the desired angle by one or more limiting stops or rests —13— and —13′— which in this instance are of different heights and are pivotally mounted on the bed —5— by means of a bolt —14— to permit either of the rests to be brought into engagement with the underside of the table —11— to hold the latter at different angles or inclined positions relatively to a horizontal plane and also relatively to the cutting edges of the cutter, which, in this instance are disposed in a vertical plane. This tiltable bed or table —11— constitutes a suitable support and guide for a carriage —15— and is provided along its inner edge with an upstanding lengthwise flange —16— forming a guide for the front edge of the carriage. This carriage is adapted to receive and support the stave —a— flatwise thereon at substantially the same angle as the table and for this purpose its upper face is substantially flat and parallel with the face of its supporting bed and is provided with one or more, in this instance, a plurality of clamping devices —17— for holding the staves flatwise upon the upper surface of the carriage. Each of these clamping devices preferably comprises an upright bracket —18— and a rotary cam —19— which is journaled on a suitable bearing —20— and is provided with an operating handle —21— and spiral cam thread —22—, the latter serving to embed itself into the adjacent surface of the stave to hold the latter firmly in its operative position and at the same time to press the stave firmly into contact with the upper face of its supporting carriage, thereby positively clamping the stave between the cam and said carriage.

The cam —19— is operatively connected to the bracket —18— by means of a coupling —23— and clamping bolt —24— both of which together with the cam —19— are adjustable vertically toward and from the upper surface of the carriage to conform to different thicknesses of staves. For this purpose, the bracket —18— is provided with a vertically elongated slot —25— for receiving the bolt —24— and said bracket is also provided with inner and outer shoulders —26— and —27— forming abutments for the outer end of the coupling —23— and a suitable washer —28— respectively. The coupling —23— is provided with a central threaded socket —29— for receiving the inner end of the clamping bolt —24— by which the coupling —23— and washer —28— may be drawn tightly against the shoulders —26— and —27— to hold the cam in its vertically adjusted position. The cam —19— is also provided with a suitable aperture for receiving the bearing —20— and a suitable pivot bolt —30— which screws into the adjacent end of the threaded socket —29— in the coupling —23— to hold the cam in operative position and at the same time permitting it to be easily removed by simply removing the pivotal bolt —30—.

The bracket —18— is secured to the upper surface of the carriage —15— by suitable clamping bolts —31— and its front face is substantially perpendicular to the upper surface of the carriage —15— so as to form an abutment for the rear edge of the stave —a— when grooving the opposite edge.

The front sides or faces of the several brackets —18— are disposed in the same straight line or plane some distance back from the guide —16— corresponding approximately to a predetermined width of stave before finishing.

The guide flange —16— of the inclined carriage supporting bed —11— is disposed in approximately the same plane as the front cutting edge of the cutter —1— and together with the main body of the carriage support —11— extends a sufficient distance to either side of said cutter to guide the carriage in moving the staves across the cutter from end to end, the portion of the guide flange near the cutter being provided with a circular recess —35— conforming to the arc of movement of the cutting edges of the knives, said flange being provided with a suitable chip breaker —36— opposed to the direction of motion of the cutters to prevent splitting of the staves during the cutting operation.

The carriage —15— preferably consists of a wood strip or board of sufficient length and width to receive and support the stave —a— and its front edge which rides along and against the guide flange —16— may be straight, tapered or swelled to produce the desired lengthwise contour of the edge of the stave which is either straight, tapered or swelled according to the form of the column of which it is to become a part and in order that both edges of the stave may be given the same taper or swell, the front portion of the carriage is provided with a separate removable and reversible section —15′—, the front edge of which is tapered or swelled to the desired degree so that when moved along the guide flange —16— against the adjacent face of the cutter —1—, the corresponding edge of the stave will be given the same degree of taper or swell.

As previously stated, the rough staves are first cut to a uniform width from end to end and are then placed upon the carriage with one straight edge against the front face of the brackets —18— which are arranged in a straight line preferably parallel with the rear edge of the carriage but at an angle with the front edge of the tapering strip or section —15'— so as to taper from right to left of Figs. 1 and 2 to a degree corresponding to one-half of the required taper of the finished stave, whereby the front edge of the stave during the initial cut will be gradually tapered as the carriage with the stave thereon is moved from left to right from one extreme end to the other of the stave across the adjacent face of the cutter, it being understood that the carriage supporting bed —11— has been previously tilted or adjusted to bevel the edge of the stave to the desired angle according to the radius of the column of which it is to form a part.

When the grooving cutter is used and the taper strip —15'— is adjusted for initially grooving, beveling and tapering one side of the stave, it is customary to run out a large number of staves before readjusting the machine for cutting the tongue, bevel and taper on the opposite edge of the stave.

In order to cut the tongue bevel and taper on the opposite edge of the stave, the cutters —1— are replaced by grooved cutters and the taper strip —15'— is reversed end for end and resecured to the main body of the carriage, the staves being also reversed end for end with the same side outermost and the previously beveled edge brought against adjustable limiting stops or rests —40— which are pivotally secured by bolts —41— at suitable intervals along and upon the upper face of the carriage with their abutting faces in a line corresponding to the line of taper or swell of the adjacent side of the stave, said abutting faces being also disposed at an angle with the upper surface of the carriage to conform to the angle of bevel of the stave.

During the first cutting operation for grooving, beveling and tapering one side of the stave when the opposite edge of the stave is resting against the front faces of the brackets —18—, the abutments —40— are swung back out of the way as shown in Fig. 1 in cutting the opposite or tongued edge, they are swung forwardly so as to project some distance in front of the front edges of the brackets with their front faces in a line at an angle with the guide flange —16— tapering from right to left of Figs. 1 and 2 so as to cut the tongued edge of the stave to the same bevel and taper as the previously grooved. In other words, the front faces of the adjustable abutments —40— are disposed in a line at an angle with that in which the front faces of the brackets or abutments —18— are located corresponding to the angle of taper of one side of the stave with the apex of such angle at the right hand end of the carriage.

The entire carriage —15— is adapted to be moved by hand along and upon its supporting table —11— with its front tapering edge in contact with the guide flange —16— and may be removed entirely from the machine and placed upon suitable supports where the blank stave is clamped in operative position with one edge resting against the front face of the brackets —18—, the cams —19— serving not only to hold the staves firmly against the upper surface of the carriage but the spiral ribs —22— operate to force the stave against the brackets when the cams are rocked to their clamping position by means of the hand levers —21—, it being understood that the tapering strip or section —15'— has been previously secured in position with its larger end at the right hand end of the carriage. The carriage supporting table —11— is then adjusted and held in its adjusted position by means of the rests —13— or —13'— to enable the stave to be cut to the desired angle according to the radius of the columns of which it is to form a part after which the entire carriage with the stave clamped thereon is placed upon the supporting table —11— with its front tapering edge against the guide flange —16— and the extreme right hand end moved to the left of the cutter so that by moving the carriage with the stave thereon to the right with its front edge at all times in contact with the guide flange —16—, particularly at the cutting point, the adjacent edge of the stave will be simultaneously grooved, beveled and tapered to the desired degree. After a large number of staves have been thus cut, the carriage is removed and the tapering strip —15— reversed end for end and resecured to the main body of the carriage whereupon the abutments —40— are rocked or adjusted to their operative positions and the entire carriage is then ready for cutting the tongue, bevel and taper on the opposite edge of the stave, this operation being substantially the same as that for cutting the grooves.

The width of the stave may be regulated by adjusting the main supporting bed —5— by means of the screw —6— while the angle of bevel may be also varied by adjusting the carriage support —11— to different angles by means of one or the other of the abutments —13— or —13'—, that is, instead of using the abutment —13— to hold the carriage in one position, it may be replaced by the abutment —13'— to reduce the horizontal angle by simply rocking these members laterally upon their pivot —14—. The clamping device —7— may also be adjusted vertically to conform to different thicknesses of staves. These staves are usually cut in the rough and afterward assembled and glued together to form the column which is then turned up and finished in a suitable turning lathe.

What I claim is:

1. In a machine for cutting column staves, a main supporting frame, a rotary cutter mounted on the frame, a main supporting bed adjustable on the frame transversely of the axis of the cutter, means for adjusting said bed, a carriage guide mounted on the bed, a carriage movable along and upon the guide, and stave clamping means mounted on the carriage.

2. In a machine for cutting column staves, a rotary cutter, a guide extending across the face of the cutter, a carriage having a tapering edge movable along and in contact with said guide, and stave clamping means mounted on the carriage.

3. In a machine for cutting column staves, a cutter, a carriage guide, a carriage having one edge provided with a reversible tapering section movable along and in contact with the guide.

4. In a machine for cutting column staves, a rotary cutter, a tapering carriage movable across the face of the cutter, a guide for the carriage, means for adjusting the carriage to different angles relatively to the axis of the cutter, separate means for adjusting the carriage toward and from said axis, and stave clamping means mounted on the carriage.

5. In a machine for cutting column staves, a rotary cutter, a carriage guide, a carriage movable across the face of the cutter and provided with a removable tapering section in sliding contact with the guide and adapted to be reversed end for end thereon, means for tilting the carriage to different angles relatively to the axis of the cutter, and stave clamping means mounted on the carriage.

In witness whereof I have hereunto set my hand on this 25th day of April 1911.

CHARLES E. ZIMMERMANN.

Witnesses:
E. F. SPEARING,
HOWARD P. DENISON.

---

Copies of this patent may be obtained for five cents each, by addressing the "Commissioner of Patents, Washington, D. C."